(12) United States Patent
Kulavik et al.

(10) Patent No.: US 10,709,974 B2
(45) Date of Patent: *Jul. 14, 2020

(54) GAMING HEADSET WITH ENHANCED OFF-SCREEN AWARENESS

(71) Applicant: Voyetra Turtle Beach, Inc., Valhalla, NY (US)

(72) Inventors: Richard Kulavik, San Jose, CA (US); Shobha Devi Kuruba Buchannagari, San Jose, CA (US)

(73) Assignee: VOYETRA TURTLE BEACH, INC., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,810

(22) Filed: Mar. 18, 2019

(65) Prior Publication Data

US 2019/0209920 A1 Jul. 11, 2019

Related U.S. Application Data

(63) Continuation of application No. 15/728,097, filed on Oct. 9, 2017, now Pat. No. 10,232,256, which is a (Continued)

(51) Int. Cl.
 *A63F 13/25* (2014.01)
 *H04S 1/00* (2006.01)
 (Continued)

(52) U.S. Cl.
 CPC .............. *A63F 13/25* (2014.09); *A63F 13/54* (2014.09); *H04R 3/12* (2013.01); *H04S 1/005* (2013.01);
 (Continued)

(58) Field of Classification Search
 CPC ......... A63F 13/25; A63F 13/54; G08B 21/24; G09B 5/00; G10L 19/00; H04B 3/00;
 (Continued)

(56) References Cited

U.S. PATENT DOCUMENTS

| 4,855,730 A | 8/1989 | Venners et al. |
|---|---|---|
| 5,872,852 A | 2/1999 | Dougherty |

(Continued)

*Primary Examiner* — Gerald Gauthier
(74) *Attorney, Agent, or Firm* — McAndrews, Held & Malloy, Ltd.

(57) ABSTRACT

Methods and systems are provided for gaming headset with enhanced off-screen awareness. An audio system that is used for outputting audio signals to a user may be configured for identifying in input audio signals, based on parameters or criteria associated with a user of the system, one or more components; and processing the input audio signals based on such identifying, with the processing including adjusting the one or more components and/or one or more other components in the output audio signals; and with the adjusting being based on characteristics of the one or more components as perceived by the user. The audio system may include circuits for handling the required functions. The circuits may include a detection circuit configured for identify the one or more components, and an adjustment circuit for applying the adjustments.

17 Claims, 9 Drawing Sheets

Related U.S. Application Data continuation of application No. 14/852,750, filed on Sep. 14, 2015, now Pat. No. 9,782,672.

(60) Provisional application No. 62/049,841, filed on Sep. 12, 2014.

(51) Int. Cl.
    *A63F 13/54* (2014.01)
    *H04R 3/12* (2006.01)
    *H04S 7/00* (2006.01)
    *H04R 5/033* (2006.01)

(52) U.S. Cl.
    CPC .............. *H04S 7/30* (2013.01); *H04R 5/033* (2013.01); *H04R 2201/107* (2013.01); *H04S 2400/11* (2013.01); *H04S 2400/13* (2013.01)

(58) Field of Classification Search
    CPC ... H04R 3/12; H04R 5/00; H04R 5/02; H04R 5/033; H04R 2201/107; H04S 1/005; H04S 3/00; H04S 7/30; H04S 2400/11; H04S 2400/13
    USPC .............. 340/4.37; 345/173, 174; 348/485; 367/121; 379/406.03; 381/1, 18, 22, 23, 381/56, 57, 92, 307, 309, 311, 96, 98, 381/103, 107, 119, 303, 94.7, 391; 455/412.2, 567; 463/35; 700/94; 701/2; 704/235; 382/103, 131; 434/307 A; 715/733, 764
    See application file for complete search history.

(56) References Cited

U.S. PATENT DOCUMENTS

| | | | |
|---|---|---|---|
| 5,912,976 A | 6/1999 | Klayman et al. | |
| 5,970,152 A | 10/1999 | Klayman | |
| 6,281,885 B1 | 8/2001 | Easty et al. | |
| 6,281,892 B1 * | 8/2001 | Long | G06F 16/9577 715/733 |
| 6,741,706 B1 * | 5/2004 | McGrath | H04S 3/004 381/22 |
| 6,766,025 B1 * | 7/2004 | Levy | H04R 3/04 381/56 |
| 7,742,609 B2 | 6/2010 | Yeakel et al. | |
| 7,817,803 B2 * | 10/2010 | Goldstein | A61B 5/0002 340/573.1 |
| 8,036,767 B2 | 10/2011 | Soulodre | |
| 8,126,172 B2 | 2/2012 | Horbach et al. | |
| 8,588,749 B1 | 11/2013 | Sadhvani et al. | |
| 8,676,273 B1 * | 3/2014 | Fujisaki | H04M 1/6505 455/567 |
| 8,687,815 B2 | 4/2014 | Ong | |
| 8,704,070 B2 | 4/2014 | Beaty et al. | |
| 9,135,920 B2 | 9/2015 | Soulodre | |
| 9,210,503 B2 | 12/2015 | Avendano et al. | |
| 9,277,343 B1 | 3/2016 | Alexandrov | |
| 9,294,207 B2 | 3/2016 | Taufour et al. | |
| 9,363,597 B1 * | 6/2016 | Kulavik | H04S 7/303 |
| 9,426,564 B2 | 8/2016 | Mitsufuji et al. | |
| 9,460,732 B2 | 10/2016 | Wingate et al. | |
| 9,462,405 B2 | 10/2016 | Lee | |
| 9,503,819 B2 | 11/2016 | Brockmole | |
| 9,544,687 B2 | 1/2017 | Srinivasan et al. | |
| 9,582,983 B2 * | 2/2017 | Dadu | G08B 21/24 |
| 9,584,235 B2 | 2/2017 | Ojala | |
| 9,621,991 B2 | 4/2017 | Virolainen et al. | |
| 9,716,958 B2 * | 7/2017 | Kulavik | H04S 3/004 |
| 9,782,672 B2 | 10/2017 | Kulavik et al. | |
| 2005/0015162 A1 | 1/2005 | Omura et al. | |
| 2005/0151640 A1 | 7/2005 | Hastings | |
| 2006/0149402 A1 | 7/2006 | Chung | |
| 2008/0140400 A1 | 6/2008 | Blass et al. | |
| 2008/0273723 A1 | 11/2008 | Hartung et al. | |
| 2009/0023123 A1 | 1/2009 | Seo | |
| 2009/0034764 A1 | 2/2009 | Ohashi | |
| 2009/0147995 A1 | 6/2009 | Sawada | |
| 2011/0081024 A1 | 4/2011 | Soulodre | |
| 2011/0106825 A1 | 5/2011 | Xiang et al. | |
| 2011/0109798 A1 | 5/2011 | McReynolds | |
| 2012/0230497 A1 | 9/2012 | Dressler et al. | |
| 2012/0295645 A1 | 11/2012 | Yariv et al. | |
| 2013/0016798 A1 * | 1/2013 | Velazquez | H04B 1/001 375/340 |
| 2013/0044128 A1 | 2/2013 | Liu et al. | |
| 2013/0058503 A1 * | 3/2013 | Kato | H04R 3/04 381/107 |
| 2013/0147836 A1 | 6/2013 | Small et al. | |
| 2013/0272096 A1 | 10/2013 | Pandharipande et al. | |
| 2014/0016786 A1 | 1/2014 | Sen | |
| 2014/0046464 A1 | 2/2014 | Reimann | |
| 2014/0046505 A1 | 2/2014 | Sakoda et al. | |
| 2014/0064517 A1 | 3/2014 | Ko | |
| 2014/0064550 A1 * | 3/2014 | Wiggins | H04R 1/023 381/391 |
| 2014/0073429 A1 | 3/2014 | Meneses et al. | |
| 2014/0082534 A1 * | 3/2014 | Cleron | G06F 3/048 715/764 |
| 2014/0086416 A1 | 3/2014 | Sen | |
| 2014/0136196 A1 * | 5/2014 | Wu | G06F 3/167 704/235 |
| 2014/0177868 A1 * | 6/2014 | Jensen | H04R 3/002 381/94.7 |
| 2014/0267161 A1 * | 9/2014 | Park | G06F 3/044 345/174 |
| 2014/0315599 A1 | 10/2014 | Teichmann et al. | |
| 2014/0348342 A1 | 11/2014 | Laaksonen et al. | |
| 2015/0003634 A1 | 1/2015 | Yliaho | |
| 2015/0098597 A1 * | 4/2015 | Kulavik | H04S 3/004 381/309 |
| 2015/0110311 A1 * | 4/2015 | Robertson | A63F 13/54 381/311 |
| 2015/0157298 A1 * | 6/2015 | Park et al. | A61B 8/5253 382/131 |
| 2016/0006879 A1 * | 1/2016 | Dickins | H04M 9/085 379/406.03 |
| 2016/0074752 A1 | 3/2016 | Kulavik et al. | |
| 2016/0183027 A1 | 6/2016 | Morrow | |
| 2016/0205486 A1 * | 7/2016 | Brown | H04R 29/00 381/56 |
| 2017/0047071 A1 * | 2/2017 | Melkote | G10L 19/008 |
| 2017/0325041 A1 * | 11/2017 | Kulavik | H04S 3/004 |
| 2018/0028908 A1 | 2/2018 | Kulavik et al. | |

* cited by examiner

GAMING HEADSET WITH ENHANCED OFF-SCREEN AWARENESS

CLAIM OF PRIORITY

This patent application is a continuation of U.S. patent application Ser. No. 15/728,097, filed on Oct. 9, 2017, which is a continuation of U.S. patent application Ser. No. 14/852,750, filed on Sep. 14, 2015, which claims priority to and benefit from U.S. Provisional Patent Application Ser. No. 62/049,841, filed on Sep. 12, 2014. Each of the above identified application is hereby incorporated herein by reference in its entirety.

TECHNICAL FIELD

Aspects of the present application relate to audio systems. More specifically, to methods and systems for gaming headset with enhanced off-screen awareness.

BACKGROUND

Limitations and disadvantages of conventional approaches to audio output devices, particularly headsets, will become apparent to one of skill in the art, through comparison of such approaches with some aspects of the present method and system set forth in the remainder of this disclosure with reference to the drawings.

BRIEF SUMMARY

Methods and systems are provided for gaming headset with enhanced off-screen awareness, substantially as illustrated by and/or described in connection with at least one of the figures, as set forth more completely in the claims.

DETAILED DESCRIPTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

In multiplayer games that are played over a local area network or the internet via a console such as Microsoft Xbox® or Sony Playstation®, game audio and voice are combined and provided via an audio output (e.g., an analog or digital output audio jack for wired output or a radio for wireless output) to which a user may connect a headset. One problem with this form of game play is that the game audio in the headset has a wide dynamic range. In other words, at times a low volume can rapidly increase to a high volume when, for instance, an explosion or other dynamic event occurs in the game. These loudness dynamics may be sustained for long periods of time, for instance during heated battle in an action game. A consequence of this wide dynamic range is that if the volume of the voice communication signals (the "chat" volume) is set for a comfortable volume level during normal game passages, they cannot be heard over the loud game audio when dynamic game passages occur. Where separate game and chat audio is provided by a gaming console to a headset, a solution for ensuring that the chat audio is comprehensible and not swamped out by the game audio is for the user to manually adjust the game and chat volumes (e.g., via buttons on his/her headset, controller, and/or in a GUI of the console). This is undesirable since it requires the player to momentarily lose control of the game as the hand moves from the game controls to adjust the chat volume level. Furthermore, where chat and game audio are premixed by the console such that separate chat and game audio signals are not available, manual, separate adjustment of chat and game volume is no longer an option. Aspects of this disclosure provide for controlling volume of chat and/or game components of combined-chat-and-game audio signals to maintain the user's ability to hear the chat audio even when the volume and frequency content of the game audio is highly variable.

Figure 1:
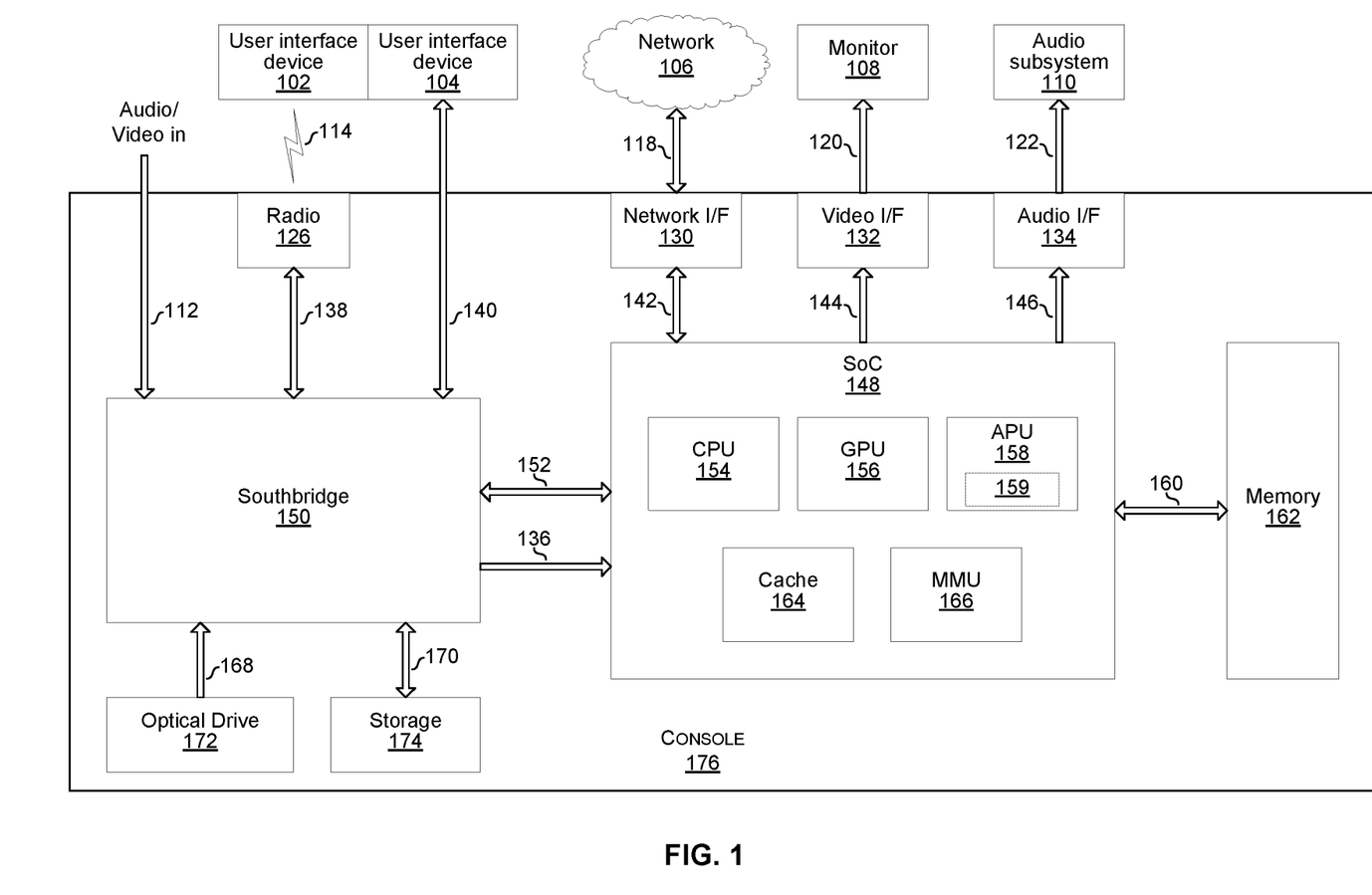
FIG. 1 depicts an example gaming console.

Referring to FIG. 1, there is shown game console 176 which may be, for example, a Windows computing device, a UNIX computing device, a Linux computing device, an Apple OSX computing device, an Apple iOS computing device, an Android computing device, a Microsoft Xbox, a Sony Playstation, a Nintendo Wii, or the like. The example game console 176 comprises a video interface 124, radio 126, data interface 128, network interface 130, video interface 132, audio interface 134, southbridge 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 136, 128, 142, 14, 146, 152, 160, 169, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 may receive audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 may comprise circuitry operable to communicate in accordance with one or more wireless standards such as the IEEE 802.11 family of standards, the Bluetooth family of standards, and/or the like.

The network interface 130 may comprise circuitry operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 may comprise circuitry operable to communicate audio in accordance with one or more wired or wireless audio transmission standards. For example, the audio interface 134 may receive CEA-861-E compliant video data via link 144 and encapsulate/format/etc. the video data in accordance with an HDMI standard for output to the monitor 108 via an HDMI link 120.

The central processing unit (CPU) 154 may comprise circuitry operable to execute instructions for controlling/coordinating the overall operation of the game console 176.

Such instructions may be part of an operating system of the console and/or part of one or more software applications running on the console.

The graphics processing unit (GPU) 156 may comprise circuitry operable to perform graphics processing functions such as compression, decompression, encoding, decoding, 3D rendering, and/or the like.

The audio processing unit (APU) 158 may comprise circuitry operable to perform audio processing functions such as volume/gain control, compression, decompression, encoding, decoding, surround-sound processing, and/or the like to output single channel or multi-channel (e.g., 2 channels for stereo or 4, 7, or more channels for surround sound) audio signals. The APU 158 comprises a memory element (e.g., a hardware or software register) 159 which stores configuration data including gain/volume settings. The configuration data may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1, the example game console 176 is communicatively coupled to a user interface device 102, a user interface device 104, a network 106, a monitor 108, and audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the monitor 108 via link(s) 120 (e.g., S/PDIF for digital audio or "line out" for analog audio).

In some instances, audio systems may be configured to enhance particular elements in audio signals. For example, in gaming scenarios, it may be desirable to enhance audio based on positioning criteria (e.g., particular areas) in relation to the user, such as based on the audio being (or not) within the field-of-view (or the main focal area) of the user. In this regard, audio in the field-of-view or the main focal area of the user may represent "on-screen" audio, with the remaining audio representing "off-screen" audio. In certain example implementations, audio systems may be configured for enhancing, for example, off-screen audio, as this may allow the user to receive audio relating to sources that may not be in their field-of-view.

In some instances, determining that an audio is on-screen or off-screen may be readily and easily made. For example, an audio may be pre-identified as such, or the source may be clearly within the user's field-of-view as the source may be right in front of the user (e.g., based on the video data). In other instances, however, determining whether an audio is off-screen or on-screen may be made adaptively and/or dynamically, such as based on characteristics of the audio and/or other pertinent parameters or criteria. For example, determining whether an audio is on-screen or off-screen may be made based on such determination of such characteristics as angle of the sound relative to the user (or, more particularly, to the user's focal view, which is assumed to extend straight from the user's face/eyes). The angle may then be used in determining (or estimating) whether the audio is on-screen or off-screen. In doing so, various criteria may be used, such as particular thresholds (e.g., audio having angle exceeding certain values, such as 90° or more right or left of the user's, may be assumed to be off-screen). Additional criteria may also be considered and/or used, such as user's preferences or presets (specifying desirable limits of field-of-view), user's input, etc. In this regard, user input may include direct, real-time input for controlling the determination of on-screen/off-screen, and/or input indirectly affecting that determination, such as user's actions affecting that determination (e.g., selection of particular option in gaming applications, such as use of binoculars or scopes, which may affect the breadth of user's field-of-view).

In some instance, the determination of the on-screen/off-screen as a whole (or the assessment of the angle of audio used therefor) may be adjusted or affected by the user's actions or selections. For example, in gaming applications, the determination as whole or the assessment of the audio angle may be game-specific—e.g., if game has only a single first-person point of view then one the user's view is used; whereas in games that have multiple viewpoints, such as first person, overhead, etc. the determination of the angle be based on which view is currently being used. In this regard, determining the current view may be made in different manner, such as from audio signatures, intercepting view-switching inputs (e.g., detecting presses of the 'X' button which switches view), or the user simply telling the headset what the current view is).

In an example implementation, determining whether an audio is on-screen or off-screen may be based on processing of left and right channels, such as by detecting elements (e.g., sounds) that are common to left and right stereo channels. Such sounds may be treated as coming from objects that are within the wearer/player's field-of-view in the game (i.e., things that are on-screen). For sounds that may be determined to be common to both the left and right channel, additional determination may be performed to make the decision as to whether these sounds are on-screen or off-screen, such as based on angle of sound determination as noted above.

In various implementations, sounds identified as on-screen (or off-screen) may be adaptively processed. For example, in an implementation, sounds identified as on-screen may be suppressed or subtracted (e.g., from the left and right channels), and/or remaining sounds, which may be perceived or treated as not being in the player's field-of-view (corresponding to objects that are off-screen) may be enhanced. Such described in more detail with respect to the following figures. Nonetheless, while off-screen enhancement circuitry is shown and described, in conjunction with some of the following figures, as providing off-screen awareness enhancement with respect to combined-game-and-chat audio streams, the disclosure is not so limited, and off-screen awareness enhancement may be applied and/or provided in substantially similar manner as described to various types of audio (e.g., game-only audio streams) where off-screen enhancement may be desirable.

Figure 2A:
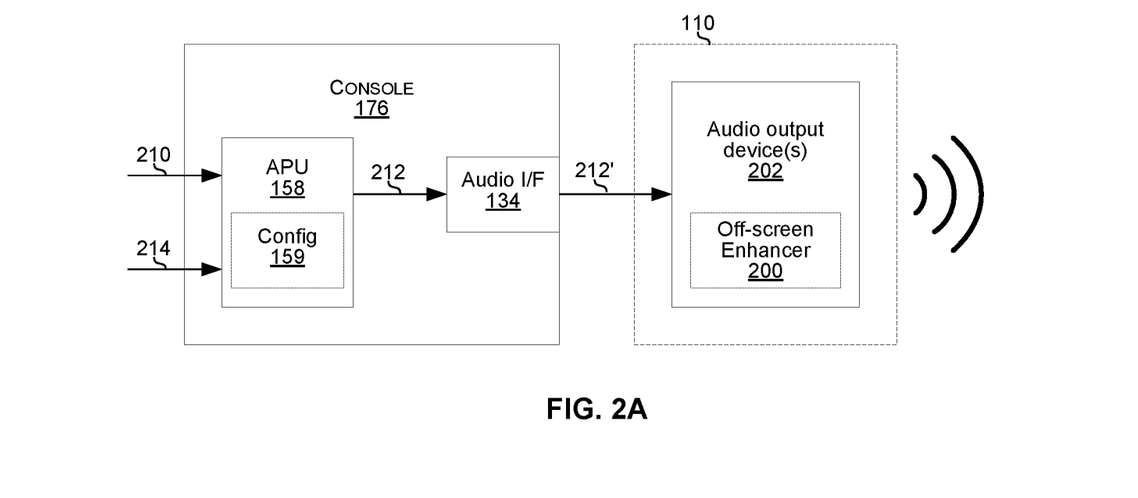
FIGS. 2A and 2B show two example audio subsystems which support enhancement of off-screen audio.

In FIG. 2A, the game console 176 is connected to an audio subsystem 110 comprising audio output device(s) 202 which, in turn, comprises an off-screen enhancer 200, which may comprise suitable circuitry that is operable to perform off-screen awareness related enhancements as described herein. The device(s) 202 may comprise, for example, a headset with integrated audio processing circuitry or a set of speakers with integrated, or associated, audio processing circuitry. An example implementation of the headset of FIG. 2A comprising an off-screen enhancement component is described with reference to FIGS. 3A-4C.

Figure 3A:
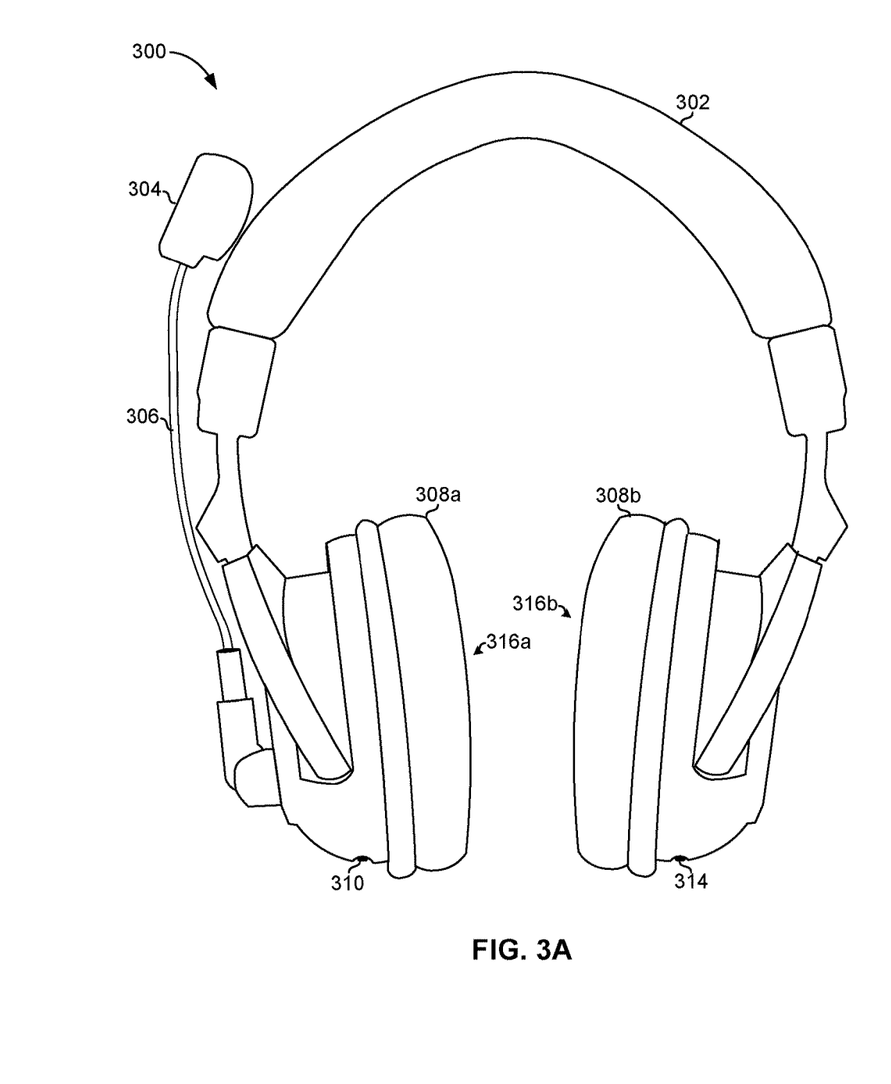
FIGS. 3A and 3B depict two views of an example embodiment of a headset operable to enhance the off-screen audio.
Figure 3B:
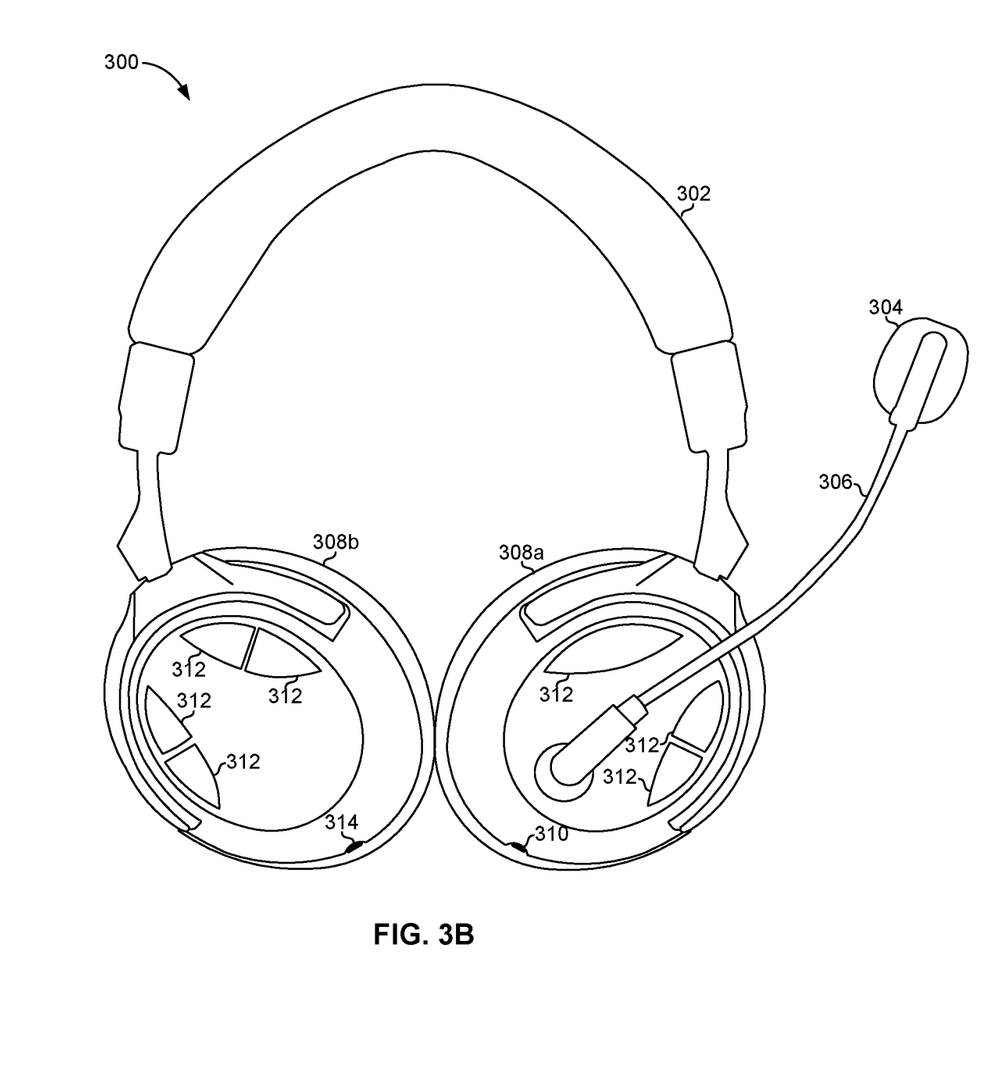

Referring to FIGS. 3A and 3B, there is shown two views of an example headset 300 that is an example embodiment of the audio output device 202 of FIG. 2A. The headset 300 comprises a headband 302, a microphone boom 306 with microphone 304, ear cups 308a and 308b which surround speakers 316a and 316b, connector 310, connector 314, and user controls 312.

The connector 310 may be, for example, a 3.5 mm headphone socket for receiving analog audio signals (e.g., receiving chat audio via an Xbox "talkback" cable).

The microphone 304 converts acoustic waves (e.g., the voice of the person wearing the headset) to electric signals for processing by the circuitry of the headset.

The speakers 316a and 316b convert electrical signals to soundwaves.

The user controls 312 may comprise dedicated and/or programmable buttons, switches, sliders, wheels, etc., for performing various functions. Example functions which the controls 312 may be configured to perform include: power the headset 300 on/off, mute/unmute the microphone 304, control gain/volume of, and/or effects applied to, chat audio by the audio processing circuitry of the headset 300, control gain/volume of, and/or effects applied to, game audio by the audio processing circuitry of the headset 300, enable/disable/initiate pairing (e.g., via Bluetooth, Wi-Fi direct, or the like) with another computing device, or the like.

The connector 314 may be, for example, a USB port. The connector 314 may be used for downloading data to the headset 300 from another computing device and/or uploading data from the headset 300 to another computing device. Such data may include, for example, configuration data that affects how audio signals in the headset 300 are processed (e.g., gain/volume settings, whether and which sound effects are added to which audio signals, etc.), and functions performed by the user controls 312. Additionally, or alternatively, the connector 314 may be used for communicating with another computing device such as a smartphone, tablet compute, laptop computer, or the like.

Figure 3C:
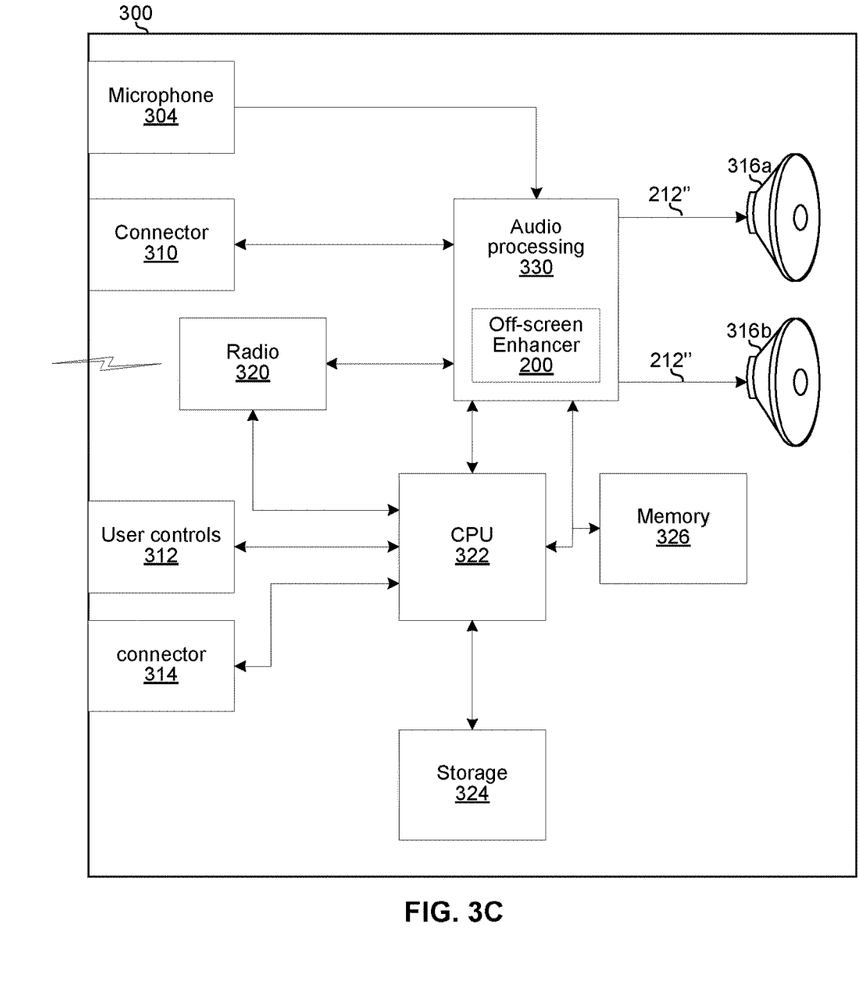
FIG. 3C depicts a block diagram of the example headset of FIGS. 3A and 3B.

FIG. 3C depicts a block diagram of the example headset 300. In addition to the connector 310, user controls 312, connector 314, microphone 304, and speakers 316a and 316b already discussed, shown are a radio 320, a CPU 322, a storage device 324, a memory 326, and an audio processing circuit 330.

The radio 320 may comprise circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation described below with reference to FIGS. 2B, 4A, and 4B, for example).

The CPU 322 may comprise circuitry operable to execute instructions for controlling/coordinating the overall operation of the headset 300. Such instructions may be part of an operating system or state machine of the headset 300 and/or part of one or more software applications running on the headset 300. In some implementations, the CPU 322 may be, for example, a programmable interrupt controller, a state machine, or the like.

The storage device 324 may comprise, for example, FLASH or other nonvolatile memory for storing configuration data, etc. which may be used by the CPU 322 and/or the audio processing circuitry 330 (e.g., loaded into volatile memory during runtime). Such data may include, for example, configuration data that affects how audio signals in the headset 300 are processed (e.g., affects gain/volume settings, whether and which sound effects are added to which audio signals, etc.), and functions performed by the user controls 312.

The memory 326 may comprise volatile memory used by the CPU 322 and/or audio processing circuit 330 as program memory, for storing runtime data, etc.

The audio processing circuit 330 may comprise circuitry operable to perform audio processing functions such as volume/gain control, compression, decompression, encoding, decoding, introduction of audio effects (e.g., echo, phasing, virtual surround effect, etc.), and/or the like to output audio signals comprising game, chat, and microphone audio to speaker 316a and 316b.

In operation, referring to both FIGS. 2A and 3C, chat audio, represented as arrow 210, and game audio, represented as arrow 214, are input to the APU 158 of the console 176. The chat audio may arrive, for example, via the network interface 130. The game audio may arrive, for example, via the Optical drive 172, the Storage 174, the link 112, and/or the network interface 130. The APU 158 may process the chat and game audio as necessary (e.g., decompress, decode, etc.) to recover a chat audio band signal ("chat audio") carrying voices of other players participating in a networked chat, and game audio band signals ("game audio") carrying the music, sound effects, etc. generated by the game. The chat audio may be a monophonic signal and the game audio may be a multi-channel signal.

The APU 158 may then mix together the chat audio and game audio resulting in combined-game-and-chat audio signals (represented as arrow 212). The respective strengths of the chat audio and game audio during mixing may be controlled based on gain/volume settings in the configuration data in memory element 159. For example, a first gain may be applied to a chat audio signal, a second gain may be applied to a left game audio signal and a right game audio signal, then the left game audio signal and chat audio signal may be mixed to produce a left combined-game-and-chat audio signal and the right game audio signal and chat audio signal may be mixed to produce a right combined-game-and-chat audio signal. The combined-game-and-chat audio signals are then conveyed to the audio interface 134 which suitably formats them (resulting in signals 212') for conveyance to the audio subsystem 110 (e.g., via link 122 of FIG. 1).

The combined-game-and-chat audio signals 212' arrive at the audio processing circuitry 330 via either the connector 310 or the radio 320. The audio processing circuitry 330 performs any processing (e.g., gain/volume control, introduction of sound effects, etc.) dictated by currently selected configuration data, resulting in signals 212", which are output to the speakers 316a and 316b.

Concurrent with outputting the combined-game-and-chat signals to the speakers 316a and 316b, the off-screen enhancer 200 may process the combined-game-and-chat audio signals to enhance off-screen audio. Example details of such processing are described below with reference to FIGS. 5 and 6.

Figure 2B:
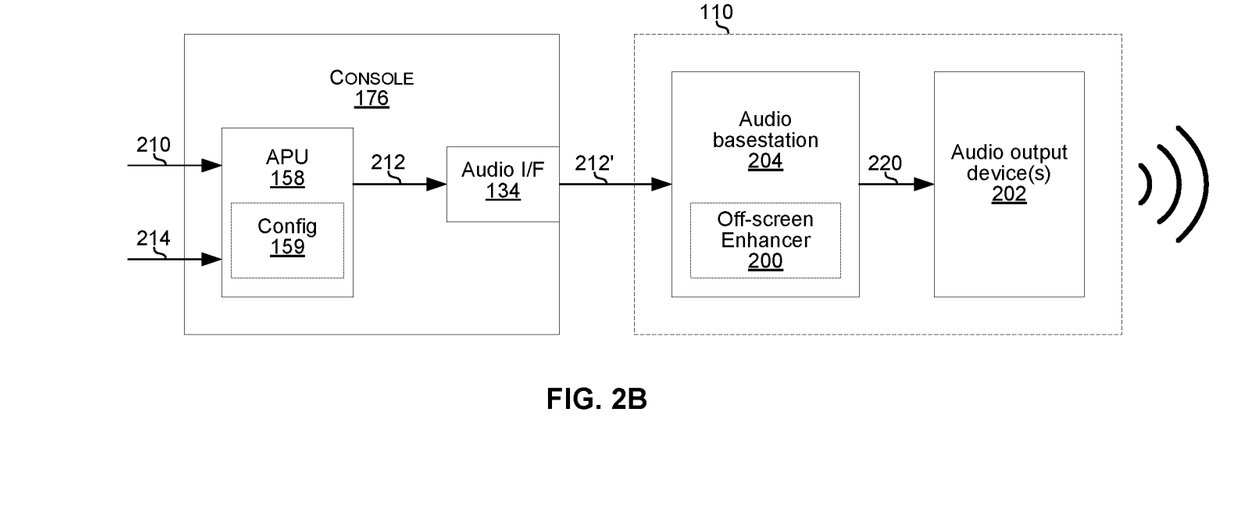

Now referring to FIG. 2B, the game console 176 is connected to an audio subsystem 110 comprising an audio basestation 204 and audio output device(s) 202. The device(s) 202 may comprise, for example, a headset similar to the headset 300 described above, but without off-screen enhancer 200. The example implementation of the audio basestation 204 depicted in FIG. 2B comprises off-screen enhancer 200 and is further described with reference to FIGS. 4A and 4B.

Figure 4A:
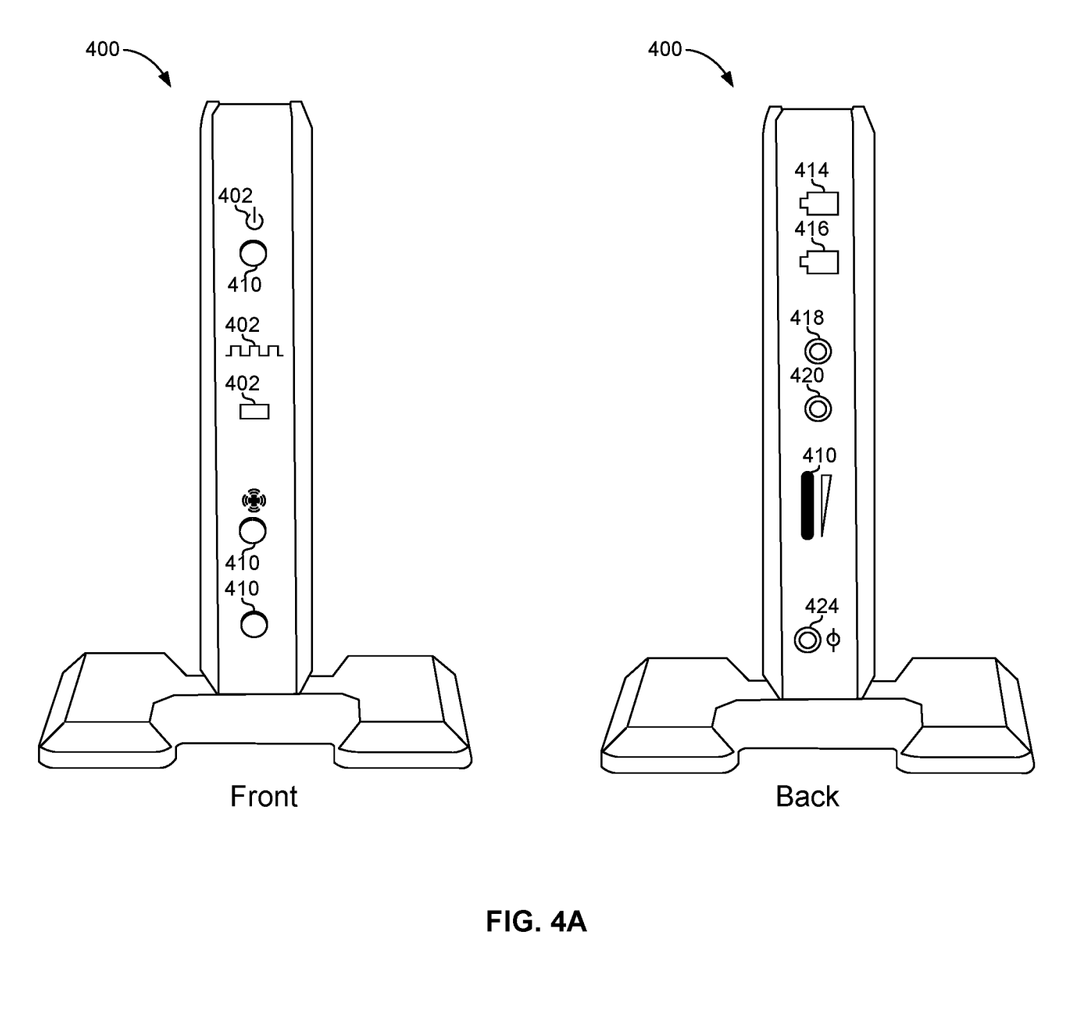
FIG. 4A depicts two views of an example embodiment of an audio basestation operable to enhance the off-screen audio.

FIG. 4A depicts two views of an example embodiment of an audio basestation 400 that is an example embodiment of the audio basestation 204 of FIG. 2B. The basestation 400 comprises status indicators 402, user controls 410, power port 424, and audio connectors 414, 416, 418, and 420.

The audio connectors 414 and 416 may comprise digital audio in and digital audio out (e.g., S/PDIF) connectors, respectively. The audio connectors 418 and 420 may comprise a left "line in" and a right "line in" connector, respectively. The controls 410 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 418 and 420. The status indicators 402 may indicate, for example, whether the audio basestation 204 is powered on, whether audio data is being received by the basestation 204 via connectors 414, and/or what type of audio data (e.g., Dolby Digital) is being received by the basestation 204.

Figure 4B:
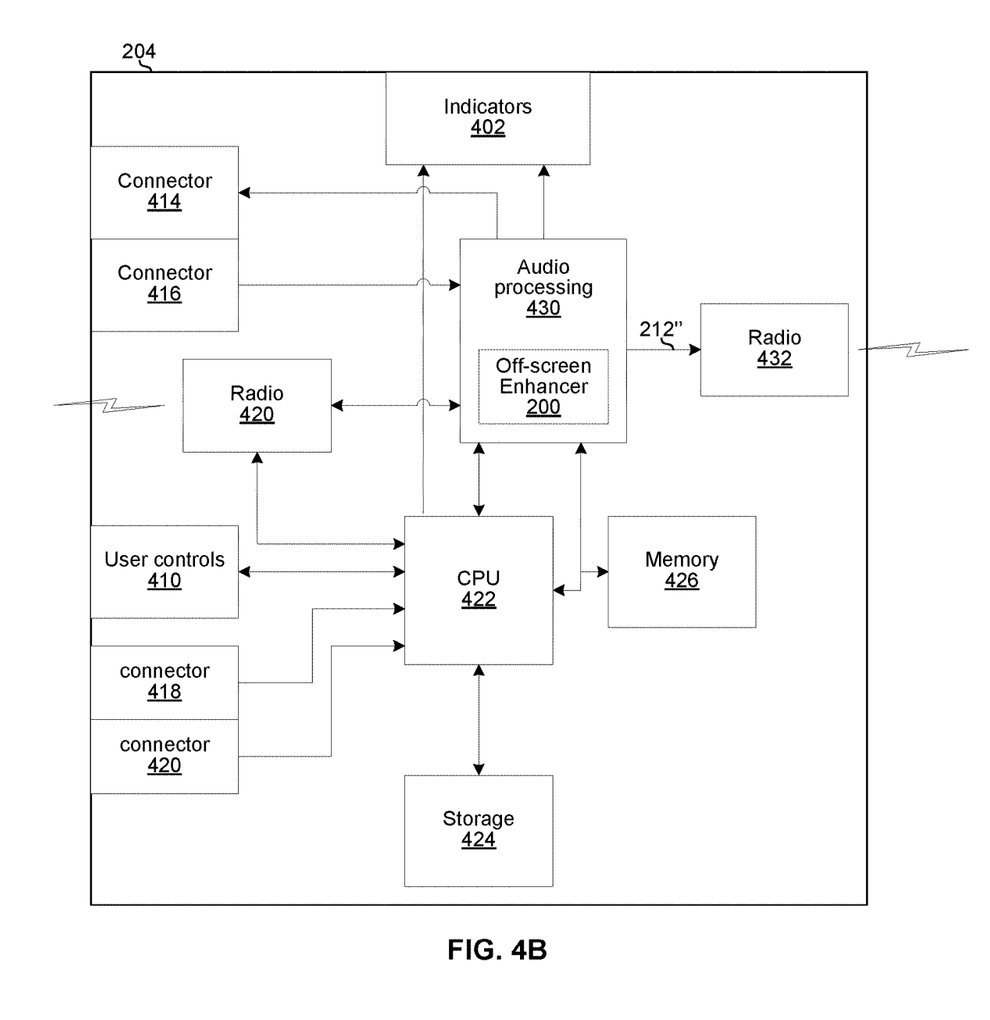
FIG. 4B depicts a block diagram of the audio basestation 300.

FIG. 4B depicts a block diagram of the audio basestation 300. In addition to the user controls 410, indicators 402, and connectors 414, 416, 418, and 420 described above, the block diagram additionally shows a CPU 422, a storage device 434, a memory 426, a radio 420, an audio processing circuit 430, and a radio 432.

The radio 420 comprises circuitry operable to communicate in accordance with one or more standardized (such as the IEEE 802.11 family of standards, the Bluetooth family of standards, and/or the like) and/or proprietary (e.g., proprietary protocol for receiving audio protocols for receiving audio from a console such as the console 176.) wireless protocols.

The radio 432 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to audio output device(s) 202).

The CPU 422 comprises circuitry operable to execute instructions for controlling/coordinating the overall operation of the audio basestation 400. Such instructions may be part of an operating system or state machine of the audio basestation 400 and/or part of one or more software applications running on the audio basestation 400. In some implementations, the CPU 422 may be, for example, a programmable interrupt controller, a state machine, or the like.

The storage 434 may comprise, for example, FLASH or other nonvolatile memory for storing configuration data, etc., which may be used by the CPU 422 and/or the audio processing circuitry 430 (e.g., by being loaded into volatile memory during runtime). Such data may include, for example, configuration data that affects how audio signals in the audio basestation 400 are processed (e.g., gain/volume settings, whether and which sound effects are added to which audio signals, etc.), and functions performed by the user controls 312.

The memory 426 may comprise volatile memory used by the CPU 422 and/or audio processing circuit 430 as program memory, for storing runtime data, etc.

The audio processing circuit 430 may comprise circuitry operable to perform audio processing functions such as volume/gain control, compression, decompression, encoding, decoding, introduction of audio effects (e.g., echo, phasing, virtual surround effect, etc.), and/or the like to output audio signals comprising game and chat to the radio 432.

In operation, referring to both FIGS. 2B and 4B, the console may operate as described above with reference to FIG. 2A.

The combined-game-and-chat audio signals 212' arrive at the audio processing circuitry 430 via either the connector 414, the connectors 418 and 420, or the radio 320. The audio processing circuitry 430 performs any processing (e.g., gain/volume control, introduction of sound effects, etc.) of the combined-game-and-chat audio signals dictated by currently selected configuration data, resulting in signals 212", which are output to the radio 432. The radio 432 converts the received combined-game-and-chat audio signals to a format suitable for transmission to the audio output device(s) 202. For example, the audio basestation modulates the audio signals 212" onto an RF carrier and transmits the resulting signal 220 wirelessly to the audio output device(s) 202.

In an example embodiment, concurrent with processing the combined-game-and-chat signals for output via radio 432, the off-screen enhancer 200 may process the combined-game-and-chat audio signals to enhance off-screen audio. Example details of such processing are described below with reference to FIGS. 5 and 6.

The audio output device 202 receives the signal 220, demodulates it to recover the combined-game-and-chat audio signals 212", performs any additional desired audio processing, and outputs to speakers such as the speakers 316a and 316b.

Figure 5:
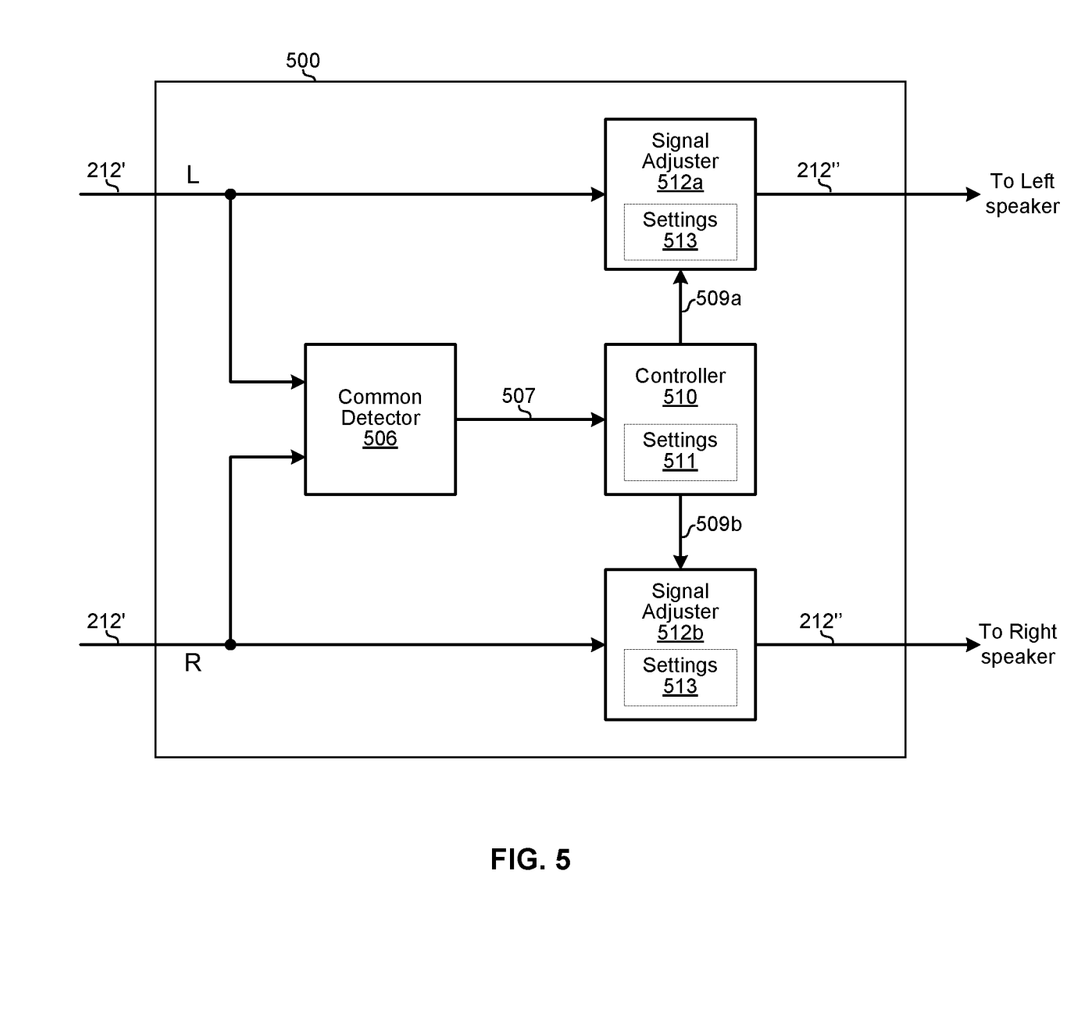
FIG. 5 depicts a high-level block diagram of example circuitry for enhancing the off-screen component of audio signals.

FIG. 5 depicts a high-level block diagram of example circuitry for enhancing off-screen components of audio signals. Shown in FIG. 5 is an off-screen enhancement circuitry 500, which may be configured for enhancing the off-screen components of audio signals—e.g., a combined-game-and-chat audio stream.

The off-screen enhancement circuitry 500 may correspond to particular example implementation of the off-screen enhancement circuitry 200 described with respect to one or more of the previous figures. In the example implementation depicted in FIG. 5, the off-screen enhancement circuitry 500 comprises a common signal detection circuit 506; a controller circuit 510; and signal adjusters 512a and 512b.

The common signal detection circuit 506 is operable to detect signal components that are common to its inputs, and to output information identifying these components—e.g., via a control signal 507. For example, in the example implementation shown in FIG. 5, the common signal detection circuit 506 may be operable to identify common components (or elements) in the left and right side signals of the combined-game-and-chat audio stream 212'. These common components (or elements) may be treated as corresponding to 'on-screen' audio, with remaining (non-common) components (or elements) being treated as 'off-screen' audio.

The common signal detection circuit 506 may also be configured to perform additional functions with respect to the input signals being processed thereby. For example, in some example implementations, common signal detection circuit 506 may be operable to obtain information (e.g., measurements) relating to the input signals or components thereof, which may be included in its output (e.g., the control signal 507) and/or may be used in generating that output.

For example, the common signal detection circuit 506 may detect for characteristics that indicate the presence of speech. These may be characteristics of particular type of audio (e.g., speech in general and/or characteristics of speech that has passed over the band-limited chat audio channel) in common or non-common components of the input signals. Example characteristics for which the circuit 506a may inspect include the presence of harmonics, formants, and/or pitch modulation. Further, the common signal detection circuit 506 may adjust its output based on the obtained information. For example, if the common signal detection circuit 506 determines that speech is not present based on determined characteristics, it may output a default strength (e.g., 0) on the signal 507 rather than an actual measured strength.

Each of the signal adjusters 512a and 512b may be operable to adjust a corresponding input (signal), such as based on pre-configured settings 511 and/or based on inputs, from other components of the system—e.g., from controller 510. For example, each of the signal adjusters 512a and 512b may be configured to adjust a respective one of the combined-game-and-audio signals 212' (e.g., left and right stereo signals), such as by subtracting (e.g., filtering out) components of these signals corresponding to on-screen audio (thus leaving only off-screen audio). Alternatively, the signal adjusters 512a and 512b may be configured to enhance the off-screen components of the respective ones of the combined-game-and-audio signals 212' (left and right) by amplifying these components and/or by reducing the components of these signals corresponding to on-screen audio (thus leaving only off-screen audio).

The signal adjusters 512a and 512b may be configured to apply the adjustment(s) effectuated thereby based on pre-set information and/or inputs, from other components of the system. For example, settings for the signal adjusters 512a and 512b may be determined by configuration data stored in their respective memory elements (e.g., hardware or software register) 513 which may be modified by the controller 510 via a respective one of signals 509a and 509b. The output of signal adjuster 512a may be applied to a left speaker (not shown). Similarly, the output of signal adjuster 512b may be applied to a right speaker (not shown).

The controller 510 may be operable to control and/or modify operations of at least some components of the systems (e.g., the signal adjusters 512a and 512b). For example, the controller 510 may be operable to determine settings (or changes thereto) in the configuration data in memory elements 513 of the signal adjusters 512a and 512b, such as to facilitate off-screen audio enhancement. In this regard, the modifications to the settings may be based on the data obtained from the common signal detection circuit 506, via the control signals 507. The controller 510 may adjust the settings automatically without need for user intervention. The adjustments may be based on other configuration(s)

which may, for example, also be stored in memory element 511, and which may be pre-configured to factory defaults and/or configurable via a graphical user interface and/or API provided by the audio subsystem 110 in which the off-screen enhancement circuitry 500 is installed While the off-screen enhancement circuitry 500 is shown and described as providing off-screen awareness enhancement with respect to combined-game-and-chat audio streams, the disclosure is not so limited, and off-screen awareness enhancement may be applied and/or provided in substantially similar manner as described with respect to FIG. 5 to various types of audio (e.g., game-only audio streams).

Figure 6:
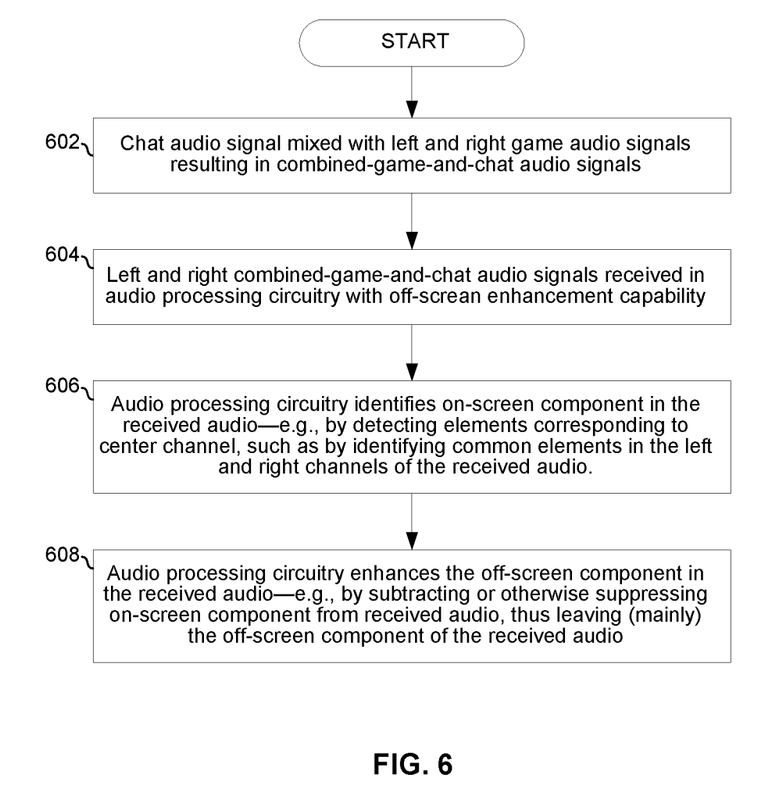
FIG. 6 depicts a flowchart of an example process for enhancing the off-screen component of combined-game-and-chat audio signals.

FIG. 6 depicts a flowchart of an example process for enhancing the off-screen component of combined-game-and-chat audio signals. Shown in FIG. 6 is flow chart 600, which comprises a plurality of example steps that may be performed in an audio system (e.g., a multiplayer video gaming system and/or a gaming headset) to enhance off-screen audio.

In step 602, an audio stream may be generated. The audio stream may comprise, for example, combined chat-and-game audio. In this regard, a chat audio signal (e.g., 210 of FIG. 2A) may be mixed with left and right game audio signals (e.g., 214 of FIG. 2A) resulting in combined-game-and-chat audio signals (e.g., 212' of FIG. 2A). Nonetheless, while the process described herein for providing off-screen awareness enhancement is described as being applied to combined-game-and-chat audio, it should be understood that the disclosure is not so limited, and that off-screen awareness enhancement may be applied to and/or provided in substantially similar manner to various types of audio (e.g., game-only audio streams).

In step 604, the left and right combined-game-and-chat audio signals may be received in audio processing circuitry having off-screen enhancement capability (e.g., 330 of FIG. 3C or 430 of FIG. 4B, each of which incorporate off-screen enhancement circuitry 200).

In block 606, the audio processing circuitry may process the received audio, particularly in conjunction with effectuating off-screen enhancement. For example, the audio processing circuitry may process the received audio to identify on-screen component in the received audio, such as by detecting elements corresponding to a center channel (e.g., by identifying common elements in the left and right channels of the received audio).

In step 608, the audio processing circuitry may enhance the off-screen component in the received audio—e.g., by subtracting or otherwise suppressing an on-screen component from received audio, thus leaving (mainly) the off-screen component of the received audio.

While the various implementations disclosed herein are described in conjunction with chat-and-game audio, it should be understood that the disclosure is not necessarily so limited, and that similar approach may be used to enhance off-screen sounds in other use scenarios.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
   an audio processing circuit that is configured to:
   identify in input audio signals, based on parameters or criteria associated with a user of the system, one or more components; and
   process the input audio signals, wherein:
   the processing comprises adjusting the one or more components and/or one or more other components in output audio signals corresponding to the input audio signals;
   the adjusting is based on characteristics of the one or more components as perceived by the user when the user is receiving the output audio signals; and
   the adjusting comprises subtracting or suppressing at least one of the one or more components.

2. The system of claim 1, wherein the audio processing circuit is configured to, when processing the input audio signals, enhance at least one of the one or more other components.

3. The system of claim 1, wherein the input audio signals comprise a plurality of channel signals, comprising at least a left channel and a right channel.

4. The system of claim 3, wherein the audio processing circuit is configured to identify the one or more components based on identification of one or more elements in the plurality of channel signals.

5. The system of claim 4, wherein the one or more elements comprise common elements in the left channel and the right channel.

6. The system of claim 1, comprising an audio output component configured to output the output audio signals.

7. The system of claim 6, wherein the audio output component comprises a headset.

8. A method comprising:
   in an audio system configured to output audio signals to a user:
   identifying in input audio signals, based on parameters or criteria associated with a user of the system, one or more components; and
   processing the input audio signals, wherein:
   the processing comprises adjusting the one or more components and/or one or more other components in the output audio signals; and the adjusting is based on characteristics of the one or more components as perceived by the user; and the adjusting comprises subtracting or suppressing at least one of the one or more components.

9. The method of claim 8, comprising configuring the adjusting to enhance perception of at least one of the one or more other components.

10. The method of claim 8, wherein the input audio signals comprise a plurality of channel signals, comprising at least a left channel and a right channel.

11. The system of claim 10, comprising identifying the one or more components based on one or more elements in the plurality of channel signals.

12. The system of claim 11, wherein the one or more elements comprise common elements in the left channel and the right channel.

13. A system comprising:
a detection circuit that is configured to identify in a plurality of input audio signals, based on parameters or criteria associated with a user of the system, one or more components;
an adjustment circuit that is configured to apply adjustment to the one or more components and/or one or more other components in output audio signals corresponding to the input audio signals, wherein:
the adjustment is based on characteristics of the one or more components as perceived by the user; and
the adjustment comprises subtracting or suppressing at least one of the one or more components.

14. The system of claim 13, wherein the detection circuit is configured to detect common elements in a left channel signal and a right channel signal in the plurality of input audio signals.

15. The system of claim 13, comprising a controller circuit configured to provide, based on the identification of the one or more components via the detection circuit, settings for controlling the adjustment applied via the adjustment circuit.

16. The system of claim 15, wherein the controller circuit is configured to determine the settings.

17. The system of claim 13, wherein the adjustment circuit is configured to apply the adjustment to enhance perception of the one or more other components.

* * * * *